United States Patent
Lin

(10) Patent No.: US 12,291,610 B2
(45) Date of Patent: May 6, 2025

(54) AQUATIC PLANT BIOMASS-BASED DECOMPOSABLE AND ANTIBACTERIAL PLASTIC MASTERBATCH COMPOSITION

(71) Applicant: Sun-Che Lin, Taichung (TW)

(72) Inventor: Sun-Che Lin, Taichung (TW)

( * ) Notice: Subject to any disclaimer, the term of this patent is extended or adjusted under 35 U.S.C. 154(b) by 453 days.

(21) Appl. No.: 17/750,761

(22) Filed: May 23, 2022

(65) Prior Publication Data

US 2023/0279189 A1    Sep. 7, 2023

(30) Foreign Application Priority Data

Jan. 28, 2022  (TW) .................................. 111104459

(51) Int. Cl.
| | | |
|---|---|---|
| *C08J 3/22* | (2006.01) | |
| *C08L 67/03* | (2006.01) | |
| *C08L 67/04* | (2006.01) | |
| *C08L 97/02* | (2006.01) | |

(52) U.S. Cl.
CPC ............... *C08J 3/226* (2013.01); *C08L 67/03* (2013.01); *C08L 67/04* (2013.01); *C08L 97/02* (2013.01); *C08J 2367/03* (2013.01); *C08J 2367/04* (2013.01); *C08J 2397/02* (2013.01); *C08L 2201/06* (2013.01); *C08L 2310/00* (2013.01)

(58) Field of Classification Search
CPC .... C08J 3/226; C08J 2367/03; C08J 2367/04; C08J 2397/02; C08J 2305/04; C08J 2405/04; C08J 2405/08; C08J 2467/02; C08J 2467/04; C08L 67/03; C08L 67/04; C08L 97/02; C08L 2201/06; C08L 2310/00; C08L 3/02; C08L 5/08; C08L 99/00; C08K 2003/325; C08K 2003/387; C08K 3/32; C08K 3/38; C08K 5/053; C08K 5/11; C08K 5/5419; C08K 3/36
See application file for complete search history.

(56) References Cited

FOREIGN PATENT DOCUMENTS

| | | | | |
|---|---|---|---|---|
| CN | 110714239 A | * | 1/2020 | ......... C08B 37/0084 |
| TW | 202140871 A | | 11/2021 | |

* cited by examiner

*Primary Examiner* — Anthony J Green
(74) *Attorney, Agent, or Firm* — Chun-Ming Shih; LANWAY IPR SERVICES

(57) ABSTRACT

An aquatic plant biomass-based decomposable and antibacterial plastic masterbatch composition contains: environmental biodegradable polymer materials, aquatic plant fiber materials, natural decomposable polymer, antibacterial materials, mineral fillers, Bis (2-ethylhexyl) adipate (DOA), 1,1,1-Tris Methylolpropane 1,1,1-Trimethylolpropane (TMP), and silane coupling agent. Thereby, low cost, excellent mechanical properties, release of far infrared rays and antibacterial effect are achieved.

8 Claims, No Drawings

AQUATIC PLANT BIOMASS-BASED DECOMPOSABLE AND ANTIBACTERIAL PLASTIC MASTERBATCH COMPOSITION

FIELD OF THE INVENTION

The present invention relates to a biodegradable plastic field, and more particularly to an aquatic plant biomass-based decomposable and antibacterial plastic masterbatch composition which is capable of reducing production cost.

BACKGROUND OF THE INVENTION

Because of rising of environmental awareness and shortage of raw materials for petrochemical products, plastic products made of biodegradable compositions are currently being developed. A conventional biodegradable composition is polylactic acid (PLA). When biodegradable plastics are disposed in the natural environment, polylactic acid is metabolized and decomposed by microorganisms in the environment. If biodegradable plastics are directly incinerated or buried, only water and carbon dioxide will be produced, so there will be no impact on the environment.

At present, biodegradable plastic products still have technical bottlenecks and cannot completely replace plastic products made of conventional petrochemical products. For example, when a glass transition temperature of biodegradable polylactic acid (PLA) is 55° C. and a melting point is 175° C., the high molecular PLA has high strength, but poor toughness, and the impact resistance of the product is obviously poor, so that it cannot be delivered in a long distances, stored in a long time, and protected completely.

To overcome the above-mentioned problems, such as easy fragmentation, the current economical and environmentally friendly degradable products are mostly based on plant fibers with high lignin (such as straw, coconut coat, etc.) and starch (such as corn starch, etc.), and then are filled with inorganic fillers to improve poor mechanical properties of materials and easy damage.

Plant fibers currently on the market are all made of agricultural and forestry crops, agricultural and forestry wastes or stems of other terrestrial plants. For example, it is made of agricultural and forestry waste resources, such as rice husk, rice straw, wheat straw, corn stalk, cotton stalk, sorghum stalk, bagasse, palm dregs, wood chips, bamboo chips, or other terrestrial plant stalks as raw materials.

Plant fibers are widely used in various fields because of diverse sources, short growth cycle, biodegradability and environmental friendliness. Plant fiber is lightweight and biodegradable. It can be used as disposable food and beverage containers, green packaging materials and building materials to avoid environmental pollution. It is an environmentally friendly material with a wide range of applications.

Plants have formed complex physical and chemical structures to defend against microbial and animal attacks during a long-term growth and evolution. The various properties of this plant material against microbial and enzymatic degradation are collectively referred to as the "anti-biodegradation barrier" of lignocellulose. In order to break the rigid and dense structure of the cell wall, de-lignin and hemicellulose, and fully expose the cellulose, an accessibility of the cellulose is increased, raw material is pretreated to destroy the protective structure.

Also, a chemical composition of natural fibers has a significant impact on the mechanical properties of composite materials, and fiber surface treatment can improve the flexural strength between fibers and matrix, this enhancing the performance of composite materials. Lignocellulose, such as rice/wheat straw is mainly composed of cellulose, lignin, hemicellulose, wax and pectin. The straw structure is uneven, and the ash content of the outer layer is significantly higher than that of the inner layer. The main components of the rice/wheat straw benzene-alcohol extract are fat and wax, which make the wheat straw dense and smooth to produce a hydrophobicity layer by using high-grade aliphatic derivatives, thus preventing the polymer matrix from infiltrating into the straw fibers. The inner surface is composed of lignin, hemicellulose and pectin. The components have extremely poor compatibility with the polymer matrix, and their will reduce the flexural strength between the straw fibers and the matrix. To give full play to the reinforcement effect of straw fibers in the matrix, proper surface treatment of lignocellulose is required. However, conventional acid-based chemical treatment methods will cause environmental pollution.

The present invention has arisen to mitigate and/or obviate the afore-described disadvantages.

SUMMARY OF THE INVENTION

The primary objective of the present invention is to provide an aquatic plant biomass-based decomposable and antibacterial plastic masterbatch composition which is capable of reducing production cost, achieving excellent mechanical properties and antibacterial effect, and releasing of far infrared rays.

Further objective of the present invention is to provide an aquatic plant biomass-based decomposable and antibacterial plastic masterbatch composition by which aquatic plant fiber materials, environmentally biodegradable polymer plastics, natural decomposable polymer antibacterial materials and mineral fillers are melted and blended at a temperature of 80° C. to 150° C. according to each mixing ratio, thus being extruded, blown, injected or thermoformed into granules and plastic masterbatches.

Another objective of the present invention is to provide an aquatic plant biomass-based decomposable and antibacterial plastic masterbatch composition by which the mechanical properties and performance metrics of antibacterial activity value of products are enhanced, and recycling and decomposition are available to avoid leaving harmful substances and having environmental pollution.

To obtain above-mentioned aspects, an aquatic plant biomass-based decomposable and antibacterial plastic masterbatch composition provided by the present invention at least consists of:

environmental biodegradable polymer materials, the environmental biodegradable polymer materials being selected from at least one of natural polymer materials, microbial synthetic polymer materials, chemically synthesized polymer materials and a combinations thereof;

aquatic plant fiber material, and the aquatic plant fiber material being selected from fibers extracted from seawater algae and/or freshwater algae;

natural decomposable macromolecular antibacterial materials, and the natural decomposable macromolecular antibacterial materials being selected from chitosan and/or alginic acid;

mineral fillers;

dioctyl adipate (DOA);

1,1,1-Trimethylolpropane (TMP); and silane coupling agent.

The environmentally biodegradable polymer material of the present invention is used as a binder for the composition.

The environmental biodegradable polymer material can use natural polymer materials, microbial synthetic polymer materials and chemically synthesized polymer materials.

The natural polymer consist of chitosan and its derivatives, starch and its derivatives, gelatin, animal and plant polysaccharides, etc.

The microbial synthetic polymers consists of PHAs, PHB, PHA, P3HB, P4HB, PHV, PHH, PHO, PHBV.

The chemically synthesized polymers include PLA and PGA of polyhydroxy acid; PCL and PBL of polycyclic lactone; PES, PBAT and PBS of aliphatic polyester; and PTMC of polycarbonate. They are used alone or in a combination.

Preferably, the environmentally biodegradable polymer materials are Thermoplastic Starch (TPS), PLA and PBAT.

The content of the environmentally biodegradable polymer material of the present invention is not particularly limited, as long as the product made of the composition exhibits good composite material properties. Preferably, a content is 15 wt % to 60 wt % based on a total weight of the composition, a preferred content is 30 wt % to 45 wt %.

To acquire impact strength and flexural strength, the composition of the present invention uses an aquatic plant fiber material as a reinforcing material.

The aquatic plant fibrous materials of the present invention are fibers extracted from seawater algae or freshwater algae.

Seawater algae include, but are not limited to, silk algae, prolifera, ulva, copper algae, sargassum, scleroderma, firleaf algae, sage, pinnate algae, racemophyll algae, asparagus, etc. Edible algae or the residue portion after use.

Freshwater algae include, but are not limited to, brown algae, red algae, green algae, or blue algae, such as green algae, diatoms, crescent algae, Micromonas, Chlamydomonas, water hyacinth (bag lily) inedible algae or their residues after use.

Preferably, the aquatic plant fiber material is silk algae. A content is 30 wt % to 80 wt % based on a total weight of the composition, and a preferable content is 40 wt % to 50 wt %.

Preferably, the thread algae fiber extracted from silk algae is the aquatic plant fiber material obtained by the inventor with Taiwan Patent Publication No. TW202140871 (a method for obtaining fiber from aquatic plants and its product). The Taiwan Patent Publication No. TW202140871 filed by the inventor is provided by the applicant GING CHI INDUSTRY CO., LTD Jingqi Industrial Co., Ltd.

Advantages of aquatic plant fibers include: (1) Aquatic plants are the largest carbon sink in the ocean, and they have a fast carbon absorption rate and are one of the blue carbon materials. (2) It is the fastest growing plant in the world, with a short growth cycle ranging from several days to several weeks; it is about dozens of times faster than terrestrial plants. (3) Originated from plants, applied to nature, the recycling of resources is convenient, the source of materials is endless, and the cost of raw materials is low. (4) It reduces the carbon footprint emission of related follow-up products and pay carbon tax. (5) The raw material does not contain lignin and other impurities, and the handling is simple and will not cause environmental processing load.

Mineral fillers of the present invention are inorganic minerals containing components such as magnesium oxide, aluminum oxide, calcium oxide, titanium dioxide, iron oxide, potassium oxide, sodium oxide, silicon dioxide or calcium hydroxyapatite. Alternatively, non-metallic minerals, such as calcium carbonate, magnesium carbonate, talc, saponite, mica powder, kaolin, tourmaline, silica, dolomite, hydrocarbyl apatite, tourmaline, borosilicate minerals are available. These can be used alone or in combination of two or more.

Preferably, the mineral filler is silica, hydrocarbyl apatite and tourmaline.

The content of the mineral filler of the present invention is not particularly limited, as long as it is made of the composition of the present invention to exhibit good impact resistance, toughness and far-infrared function.

Preferably, a content of the mineral filler is 3 wt % to 10 wt % based on a total weight of the composition, more preferably 5 wt to 7 wt %.

The tourmaline of the present invention is used to provide the product with releasing negative ions, far infrared rays and adsorbing heavy metals. The silicon dioxide ($SiO_2$) is configured to increase the impact resistance of the product.

The hydrocarbyl apatite Hydroxylaptite is composed of 25 wt % calcium hydroxyapatite (Calcium Hydroxylaptite, CaHA) and 75 wt % gel, a structure is 25 microns to 45 microns in a diameter, and has excellent biocompatibility and biodegradability. As a filler of polylactic acid, by containing elastomer gel and inorganic mineral Calcium Hydroxylaptite (CaHA), the physical properties of the material can be changed during molding, which make the finished product softer and easier to bend.

In the above-mentioned composition of the present invention, in order to obtain a flexibility, a dioctyl adipate plasticizer is added to the composition. The dioctyl adipate of the present invention is selected from the dioctyl adipate (Bis (2-ethylhexyl) adipate (DOA) numbered DAIFATTY-101 of Japan's Daiba Chemical Industry Co., Ltd.). Preferably, a content is 0.5 wt % to 5 wt % based on a total weight of the composition.

(Bis (2-ethylhexyl) adipate (DOA) is a biodegradable resin and has not only obtained the biodegradation certification from the Japan Bioplastics Association, but also the European OK compost certification. It has been confirmed to be compatible with dioctyl adipate Biodegradable resins include: PLA, PBAT, PBS, PHBH and starch-based resins. High rigidity is one of the disadvantages of polylactic acid, and dioctyl adipate has excellent compatibility with polylactic acid, and has high plasticization efficiency. Adding dioctyl adipate can obtain about 300% elongation of polylactic acid, thus improving the toughness of polylactic acid. Preferably, discarded products accelerates the decomposition of microorganisms.

In order to obtain a certain impact resistance of the product, 1,1,1-Trimethylolpropane (TMP) chain extender is added to the composition. PLA is a semi-crystalline polymer. Due to its slow crystallization rate and fast cooling rate in conventional processing technology, it often becomes amorphous after processing, which makes the product harder and more brittle, with poor impact resistance. And the flexibility (flexibility) is not good. 1,1,1-Trimethylolpropane has good crystallinity resistance, and as a chain extender of PLA, it is capable of improving the strength and flexibility of products. Preferably, the 1,1,1-Trimethylolpropane (TMP) content is 0.1 wt % to 2.0 wt % based on a total weight of the composition.

To obtain a certain surface tension and improve the tensile strength of the product, an organosilane coupling agent (silane coupling agent) is added to the composition, thus being used to various products with different surface tensions. Suitable silane coupling agents include 350W, 487U, 488U from UniqChem Company of Germany or BKY-3400, BKY-3450 and BKY-3451 from BKY Company of Germany. Preferably, it is selected from BKY-3451 made by BYK, Germany. Preferably, the content is 0.3 wt % to 2.0 wt % based on the total weight of the composition.

To achieve bacterial inhibition, natural decomposable antibacterial polymer materials are added.

Because chitosan has antibacterial properties and is a positive charged natural organic matter, it facilitate the product having positive charge, biodegradability, biocompatibility and antibacterial function. Also, it has a good inhibitory effect on *Escherichia coli* and *Staphylococcus aureus*.

The chitosan of the present invention is selected from Taiwan Youhe Trading Co., Ltd. (UNI-ONWARD CORP), the brand name is ARO, the product name is CHITOSAN, MOLECULAR WEIGHT: 100,000 to 300,000 (molecular weight is about 100,000 to 300,000). Preferably, the chitosan content is 7 wt % to 15 wt % based on the total weight of the composition, it is more preferably 8 wt %.

Alginic acid is a high-viscosity polymer compound capable of improving the adhesion between polylactic acid and cellulose. The alginic acid (Alginic acid) of the present invention is selected from UNI-ONWARD CORP in Taiwan, and the product name is ALGINIC ACID, FROM BROWN ALGAEBROWN ALGAE. A preferable content is 2 wt % to 15 wt % based on a total weight of the composition.

The compositions of the present invention further includes functional additives commonly used in the art, such as antistatic agents, flame retardants, lubricants, colorants, anti-wear agents or antioxidants. Since these additives are various conventional products, they should be well known to those with ordinary knowledge in the technical field to which the present invention belongs, and will not be repeated here.

DETAILED DESCRIPTION OF THE PREFERRED EMBODIMENTS

With reference to Table 1, an aquatic plant biomass-based decomposable and antibacterial plastic masterbatch composition according to a preferred embodiment of the present invention is described by comparing treatment groups E1 to E10 compositions with control groups C1 to C2.

The main raw materials used in the preferred embodiment of the present invention are as follows:

(1) Polylactic Acid (PLA) which comes from Taiwan UNI-ONWARD CORP, it's brand name is SIA, and product name is POLYLACTIC ACID. MOLECULAR WEIGHT: 60,000;
(2) Thermoplastic Starch (TPS) which comes from Taiwan UNI-ONWARD CORP, it's brand name is SIA, and its starch is from potato;
(3) Polybutylene Adipate Terephthalate (PBAT) which comes from Chang Chun company, PBAT PBAT ECO-A20;
(4) Filamentous Algae Fiber which comes from GING CHI INDUSTRY CO., LTD, and fiber diameter is 3 to 9 microns, average is 5.5 microns;
(5) Chitosan which comes from Taiwan UNI-ONWARD CORP, it's brand name is ARO, and product name is CHITOSAN, MOLECULAR WEIGHT: 100,000 to 300,000;
(6) Alginic acid which comes from Taiwan UNI-ONWARD CORP, its product name is ALGINIC ACID from Brown Algaebrown Algae;
(7) Silicon Dioxide ($SiO_2$) which comes from Taiwan UNI-ONWARD CORP, it's brand name is ALF, and its product name is Silicon (IV) oxide from powders of less than 10 micron;
(8) Tourmaline which comes from a brand of DAIZEN, powder of 100 to 1000 mesh, emitting far infrared rays (4 to 14 microns);
(9) Hydroxylapatite which is produced by BioNovoGene and is white powders, molecular weight of the hydroxylapatite is 502.31, and calcium content of the hydroxylapatite is 23.0% to 25.5%;
(10) Bis (2-ethylhexyl) adipate (DOA) which comes from No. DAIFATTY-101 of Japan Daiba Chemical Industry Co., Ltd.;
(11) 1,1,1-Trimethylolpropane (TMP) which comes from Taiwan UNI-ONWARD CORP, it's brand name is ALD, and its product name is TRIMETHYLOLPROPANE;
(12) Silane coupling agent which comes from product BYK-3451 produced by BYK-Chemie GmbH;

TABLE 1

| Constituent (wt %) | | E1 | E2 | E3 | E4 | E5 | E6 | E7 | E8 | E9 | E10 | C1 | C2 |
|---|---|---|---|---|---|---|---|---|---|---|---|---|---|
| PLA | | 60 | 45 | 30 | 15 | 0 | 60 | 45 | 30 | 22 | 8 | 93 | |
| TPS | | | | | 7 | 18 | | | | | 8 | | |
| PBAT | | | | | | | | | | | 8 | | 93 |
| Thread Alagae fibler | | 30 | 40 | 50 | 60 | 70 | 30 | 40 | 50 | 60 | 70 | 0 | 0 |
| Chitosan | | 5 | 8 | 11 | 7 | 5 | 0 | 0 | 0 | 0 | 0 | 0 | 0 |
| Alginic acid | | 0 | 0 | 0 | 0 | 0 | 5 | 8 | 11 | 8 | 2 | 0 | 0 |
| Silicon dioxide ($SiO_2$) | | 3 | 5 | 7 | 6 | 0 | 0 | 0 | 0 | 0 | 0 | 5 | 5 |
| Tourmaline | | | | | 3 | 5 | | | | | | | |
| Hydroxylapatite | | 0 | 0 | 0 | 0 | 0 | 3 | 5 | 7 | 8 | 2 | 0 | 0 |
| Bis(2-ethylhexyl)adipate | | 1 | 1 | 1 | 1 | 1 | 1 | 1 | 1 | 1 | 1 | 1 | 1 |
| 1,1,1-Trimethylolpropane | | 0.3 | 0.3 | 0.3 | 0.3 | 0.3 | 0.3 | 0.3 | 0.3 | 0.3 | 0.3 | 0.3 | 0.3 |
| silane coupling agent | | 0.7 | 0.7 | 0.7 | 0.7 | 0.7 | 0.7 | 0.7 | 0.7 | 0.7 | 0.7 | 0.7 | 0.7 |
| Mechanical property | Flexural Strength | 89 | 102 | 85 | 81 | 70 | 90 | 104 | 85 | 80 | 86 | 55 | 66 |
| | Impact Strength | 28 | 30 | 32 | 29 | 21 | 36 | 30 | 33 | 29 | 29 | 18 | 23 |
| | Tensile Strength | 82 | 99 | 90 | 79 | 76 | 83 | 100 | 91 | 78 | 90 | 45 | 68 |
| R | *Staphylococcus aureus* | <2 | 3.3 | 3.4 | 2.6 | <2 | 3.4 | 4.1 | 4.8 | 4.2 | 3.1 | <2 | <2 |
| | *Escherichia coli* | <2 | 3.1 | 3.3 | 2.8 | <2 | 3.5 | 4.3 | 4.6 | 4.4 | 3.0 | <2 | <2 |

1. Flexural Strength: ASTM D790(MPa)
2. Impact Strength: ASTM D-256(j/m)
3. Tensile Strength: ASTM D-638(MPa)
4. Antibacterial Activity Value(R): JIS Z-2801(ISO 22196), R[ $3 \geq R \geq 2$:having antibacterial effect); [ $R \geq 3$ Strong antibacterial ]. Using bacteria type: *Staphylococcus aureus* (ATCC 6538P) and *Escherichia coli* (ATCC 8739) (Measuring antibacterial activity value of non-porous surface of plastic)

Composition E1 consists of:
PLA (60 wt %);
Thread Alagae fibler (30 wt %);
Chitosan (5 wt %);
SiO$_2$ (3 wt %);
Bis (2-ethylhexyl) adipate (DOA) (1 wt %);
1,1,1-Trimethylolpropane (TMP) (0.3 wt %); and
Silane coupling agent (0.7 wt %).
Composition E2 consists of:
PLA (45 wt %);
Thread A lagae fibler (40 wt %);
Chitosan (8 wt %);
SiO$_2$ (5 wt %);
Bis (2-ethylhexyl) adipate (DOA) (1 wt %);
1,1,1-Trimethylolpropane (TMP) (0.3 wt %); and
Silane coupling agent (0.7 wt %).
Composition E3 consists of:
PLA (30 wt %);
Thread Alagae fibler (50 wt %);
Chitosan (11 wt %);
SiO$_2$ (7 wt %);
Bis (2-ethylhexyl) adipate (DOA) (1 wt %);
1,1,1-Trimethylolpropane (TMP) (0.3 wt %); and
Silane coupling agent (0.7 wt %).
Composition E4 consists of:
PLA (15 wt %);
Thermoplastic Starch (TPS) (7 wt %);
Thread Alagae fibler (60 wt %);
Chitosan (7 wt %);
SiO$_2$ (6 wt %);
Tourmaline (3 wt %);
Bis (2-ethylhexyl) adipate (DOA) (1 wt %);
1,1,1-Trimethylolpropane (TMP) (0.3 wt %); and
Silane coupling agent (0.7 wt %).
Composition E5 consists of:
Thermoplastic Starch (TPS) (18 wt %);
Thread Alagae fibler (70 wt %);
Chitosan (5 wt %);
Tourmaline (5 wt %);
Bis (2-ethylhexyl) adipate (DOA) (1 wt %);
1,1,1-Trimethylolpropane (TMP) (0.3 wt %); and
Silane coupling agent (0.7 wt %).
Composition E6 consists of:
PLA (60 wt %);
Thread Alagae fibler (30 wt %);
Alginic acid (5 wt %);
Hydroxylapatite (3 wt %);
Bis (2-ethylhexyl) adipate (DOA) (1 wt %);
1,1,1-Trimethylolpropane (TMP) (0.3 wt %); and
Silane coupling agent (0.7 wt %).
Composition E7 consists of:
PLA (45 wt %);
Thread Alagae fibler (40 wt %);
Alginic acid (8 wt %);
Hydroxylapatite (5 wt %);
Bis (2-ethylhexyl) adipate (DOA) (1 wt %);
1,1,1-Trimethylolpropane (TMP) (0.3 wt %); and
Silane coupling agent (0.7 wt %).
Composition E8 consists of:
PLA (30 wt %);
Thread Alagae fibler (50 wt %);
Alginic acid (11 wt %);
Hydroxylapatite (7 wt %);
Bis (2-ethylhexyl) adipate (DOA) (1 wt %);
1,1,1-Trimethylolpropane (TMP) (0.3 wt %);
Silane coupling agent (0.7 wt %).
Composition E9 consists of:
PLA (22 wt %);
Thread Alagae fibler (60 wt %);
Alginic acid (8 wt %);
Hydroxylapatite (8 wt %);
Bis (2-ethylhexyl) adipate (DOA) (1 wt %);
1,1,1-Trimethylolpropane (TMP) (0.3 wt %);
Silane coupling agent (0.7 wt %).
Composition E10 consists of:
PLA (8 wt %);
Thermoplastic Starch (TPS) (8 wt %);
Polybutylene Adipate Terephthalate (PBAT) (8 wt %);
Thread Alagae fibler (70 wt %);
Alginic acid (2 wt %);
Hydroxylapatite (2 wt %);
Bis (2-ethylhexyl) adipate (DOA) (1 wt %);
1,1,1-Trimethylolpropane (TMP) (0.3 wt %);
Silane coupling agent (0.7 wt %).
Composition C1 consists of:
PLA (93 wt %);
SiO$_2$ (5 wt %);
Bis (2-ethylhexyl) adipate (DOA) (1 wt %);
1,1,1-Trimethylolpropane (TMP) (0.3 wt %); and
Silane coupling agent (0.7 wt %).
Composition C2 consists of:
PBAT (93 wt %);
SiO$_2$ (5 wt %);
Bis (2-ethylhexyl) adipate (DOA) (1 wt %);
1,1,1-Trimethylolpropane (TMP) (0.3 wt %); and
Silane coupling agent (0.7 wt %).

The compositions prepared according to above examples E1-E10 and the control group C1 (PLA plastic) and C2 (PBAT plastic) are shown in Table 1, then each composition is extruded by a screw squeezing machine to produce five sheets with an average thickness of 3.5 mm (including three sheets of 120 mm long×25 mm wide and two sheets of 5 cm long×5 cm wide) to provide mechanical properties (three sheets).) and an overall performance metrics of the antibacterial activity value (2 tablets), wherein (A) A mechanical-property test method including
Specimen type: A plastic testing sheet is a length 120 mm×a width 25 mm (totaling three testing sheets, and a thickness of each testing sheet is 3.5 mm).
Testing items includes:
1) Bending test, wherein a testing standard is ASTM D79, a bending stress at which a test loading reaches a maximum value is called Flexural Strength, and a unit is Mpa;
2) Impact test, wherein a testing standard is ASTM D256, a determination of Izod pendulum impact strength (Impact Strength), and an unit is j/m;
3) Tensile teat, wherein a testing standard is ASTM D-638, and an instron Test is applied to test a tensile strength, and a unit is Mpa (B) A antibacterial testing method including
Specimen type: A plastic testing sheet is a length 5 cm×a width 5 cm (totaling two testing sheets, and a thickness of each testing sheet is 3.5 mm);
wherein testing items includes:
1) Antibacterial test, wherein a testing standard is JIS Z-2801 (ISO 22196), and an antibacterial Activity Value (R) [3≥R≥2, having antibacterial effect), R≥3 powerful antibacterial], Test strains include: *Staphylococcus aureus*, ATCC 6538P and *Escherichia coli* (ATCC 8739).
2) Test bacteria concentration, 2.5×10$^5$~1.0×10$^6$ CFU/mL, inhibition of a growth or a reproduction of microorganisms after 24±1 hours (measuring an antibacterial activity value of non-porous surface of the plastic testing sheet).

Referring Table 1, mechanical properties of the control groups C1 (PLA plastic) and C2 (PBAT plastic) including:

A flexural strength of C1 is 55 MPa, an impact strength of C1 is 18 j/m, and a tensile strength of C1 is 45 MPa.

Antibacterial activity against *Staphylococcus aureus* (ATCC 6538P) and *Escherichia coli* (ATCC 8739) is R<2, so it presents no antibacterial effect.

A flexural strength of C2 of C2 is 66 Mpa, an impact strength of C2 is 23 j/m, and a tensile strength of C2 is 68 MPa.

Antibacterial activity against *Staphylococcus aureus* (ATCC 6538P) and *Escherichia coli* (ATCC 8739) is R<2, so it presents no antibacterial effect.

A bending strength of C2 (PBAT plastic) is 120%, an impact strength of C2 (PLA plastic) is 127%, and a tensile strength of C1 (PLA plastic) is 150%.

Referring to Table 1 again, It is known that the mechanical properties of the compositions E1 to E10 of the present invention are better than those of the control group C1 (PLA plastic) and C2 (PBAT plastic), wherein:

Compositions E1 to E5 dominate that polylactic acid added different proportions of filamentous algae fibers, mineral fillers use different proportions of silica and tourmaline, and mechanical properties and antibacterial activity values of antibacterial materials using different proportions of chitosan (performance metrics), wherein the bending strength of composition E1 at 60 wt % polylactic acid+30 wt % filamentous algae fiber is 117 MPa, the impact strength is 35 j/m, and the tensile strength is 115 MPa, thus obtaining optimal mechanical properties mechanical properties.

E6 to E10 denote the mechanical properties and antibacterial activity values of polylactic acid added with different proportions of filamentous algae fibers, mineral fillers with different proportions of hydrocarbyl apatite, and antibacterial materials with different proportions of alginic acid, wherein the flexural strength of E6 in 60 wt % PLA+30 wt % filamentous algae fibers is 115 MPa, the impact strength is 36 j/m, and the tensile strength is 113 MPa, thus obtaining optimal mechanical properties.

It represents from compositions E1 to E5 in Table 1 that filamentous algae fibers are added to the composition of the present invention to increase the strength of the polylactic acid base material. When adding small amount of plant filamentous algae fibers to the thermal deformation temperature, impact strength, tensile strength and bending strength are poor. However, when adding the polylactic acid to the filamentous algae fiber, it reaches a certain proportion (about 40 wt %) to reduce the mechanical properties and strength of fiber entanglement and aggregation (E3 to E5 cause a reduction). Yet, the mechanical properties are still higher than those of the control group, which may be related to the increase of the viscosity of polylactic acid or thermoplastic starch with the content, because the viscosity will increase with the concentration. Although the content of biodegradable polymers (polylactic acid and thermoplastic starch) in E4 and E5 was reduced to 22 wt % and 18 wt %, the chitosan content remained at 5-7 wt %, thus maintaining mechanical properties in a certain level.

For compositions E1 to E5, when the weight percentages of mineral filler silica are 3 wt %, 5 wt %, 7 wt %, and 6 wt %, respectively, the mechanical properties of the material do not improve with an increase of the content. From compositions E1 to E5, addition of mineral fillers (i.e. silica) is 5 wt % to obtain outstanding mechanical properties of the material. Therefore, in the compositions E1 to E5 of the present invention, E2 shows the best mechanical properties.

With reference to Table 1, for compositions E6 to E10, when the mineral filler is changed to hydrocarbyl apatite, the weight percentage ratios are 3 wt %, 5 wt %. 7 wt %, 8 wt %, 2 wt %, wherein the flexural strength of the composition E7 (consisting of 45 wt % polylactic acid+40 wt % silk algae fiber+5 wt % hydrocarbyl apatite) is 104 MPa, the impact strength is 30 j/m, and the tensile strength is 100 MPa. It is seen that using hydrocarbyl apatite as the mineral filler of composition E7 is better than using silicon dioxide of composition E2, but considering a market cost in an actual implementation, silicon dioxide is always chosen.

As shown in Table 1, when adding 5 wt %, 8 wt %, 11 wt %, 7 wt %, and 5 wt % of Chitosan to compositions E1 to E5, the antibacterial activity value (R) obtains a strong antibacterial effect when the content of the composition E5 is 8 wt % (antibacterial activity value R>3). When adding alginic acid to compositions E6 to E10, compositions E6 to E10 have strong antibacterial effect (antibacterial activity value R>3). Therefore, in terms of performance metrics of antibacterial activity value, the use of chitosan is more than 8 wt % so as to have a strong antibacterial effect. However, a strong antibacterial effect is obtained by only adding alginic acid of 3 wt % or more. Therefore, when considering the market cost in actual implementation, low-cost alginic acid is selected.

Adding tourmaline to the mineral filler of the compositions E4 to E5 of Table 1, negative ions and far infrared rays (4 to 14 microns) are released. Agricultural film products made of the compositions E1 to E10 facilitate elongation of plant stems and germination of spores or seeds, production of chlorophyll, and decomposition of carbon dioxide.

The compositions of the E1 to E10 in Table 1 have better mechanical properties than the control group C1 (PLA plastic) and C2 (PBAT plastic).

What is claimed is:

1. An aquatic plant biomass-based decomposable and antibacterial plastic masterbatch composition consisting of:
    15 wt % to 60 wt % of environmental biodegradable polymer materials, the environmental biodegradable polymer materials being selected from at least one of natural polymer materials, microbial synthetic polymer materials, chemically synthesized polymer materials and a combinations thereof;
    30 wt % to 80 wt % of aquatic plant fiber material, and the aquatic plant fiber material being selected from fibers extracted from seawater algae and/or freshwater algae;
    2 wt % to 15 wt % of natural decomposable macromolecular antibacterial materials, and the natural decomposable macromolecular antibacterial materials being selected from chitosan and/or alginic acid;
    2 wt % to 10 wt % mineral fillers;
    0.5 wt % to 5 wt % dioctyl adipate (DOA);
    0.1 wt % to 2 wt % 1,1,1-Trimethylolpropane (TMP); and
    0.3 wt % to 2 wt % of silane coupling agent.

2. The aquatic plant biomass-based decomposable and antibacterial plastic masterbatch composition as claimed in claim 1, wherein the natural polymer material is selected from at least one of chitosan, starch, gelatin, animal polysaccharide, plant polysaccharide and a combination thereof.

3. The aquatic plant biomass-based decomposable and antibacterial plastic masterbatch composition as claimed in claim 1, wherein the microbial synthetic polymer material is selected from a group consisting of at least one of polyhydroxyalkanoates (PHA), polyhydroxybutyrates (PHB), polyhydroxyalkanoates (PHA), poly-3-hydroxybutyrate (P3HB), poly-4-hydroxybutyrate (P4HB), polyhydroxyvalerate (PHV), polyhydroxycaproate (PHH), polyhydroxyoctanoate (PHO), poly(3-hydroxybutyric acid-co-3-hydroxyvalerate) (PHBV) and a combination thereof.

4. The aquatic plant biomass-based decomposable and antibacterial plastic masterbatch composition as claimed in claim 1, wherein the chemically synthesized polymer material is selected from at least one of polyhydroxyacids, polycyclic lactones, aliphatic polyesters, polycarbonates or combinations thereof; wherein the polyhydroxyacids are selected from polylactic acid (PLA), polyglycolic acid (PGA)) or a combination thereof: the polycyclic lactones are selected from at least one of poly-ε-caprolactone (PCL), polycyclobutyrolactone (PBL) and a combination thereof; the aliphatic polyesters are selected from at least one of polyether sulfone (PES), polybutylene terephthalate adipate (PBAT), polybutylene succinate (PBS) and a combination thereof: the polycarbonates are selected from polytrimethylene carbonate (PTMC).

5. The aquatic plant biomass-based decomposable and antibacterial plastic masterbatch composition as claimed in claim 1, wherein the seawater algae are selected from a group consisting of at least one of filamentous algae, prolifera, Ulva, copper algae, sargassum, bristle algae, fir-leaf algae, sage, pinnae algae, racemophyll algae and a combination thereof.

6. The aquatic plant biomass-based decomposable and antibacterial plastic masterbatch composition as claimed in claim 1, wherein the freshwater algae are selected from at least one of brown algae, red algae, green algae, cyanobacteria and a combination thereof.

7. The aquatic plant biomass-based decomposable and antibacterial plastic masterbatch composition as claimed in claim 1, wherein the mineral filler is any one of magnesium oxide, aluminum oxide, calcium oxide, titanium dioxide, iron oxide, potassium oxide, sodium oxide, silicon dioxide and calcium hydroxyapatite.

8. The aquatic plant biomass-based decomposable and antibacterial plastic masterbatch composition as claimed in claim 1, wherein the mineral filler is selected from at least one of calcium carbonate, magnesium carbonate, talc, saponite, mica powder, kaolin, tourmaline, silica, dolomite, hydrocarbyl apatite, tourmaline, borosilicate minerals and a combination thereof.

* * * * *